No. 703,193. Patented June 24, 1902.
R. A. HAMILTON.
THREAD CUTTING APPLIANCE.
(Application filed Nov. 9, 1900. Renewed Apr. 3, 1902.)
(No Model.)
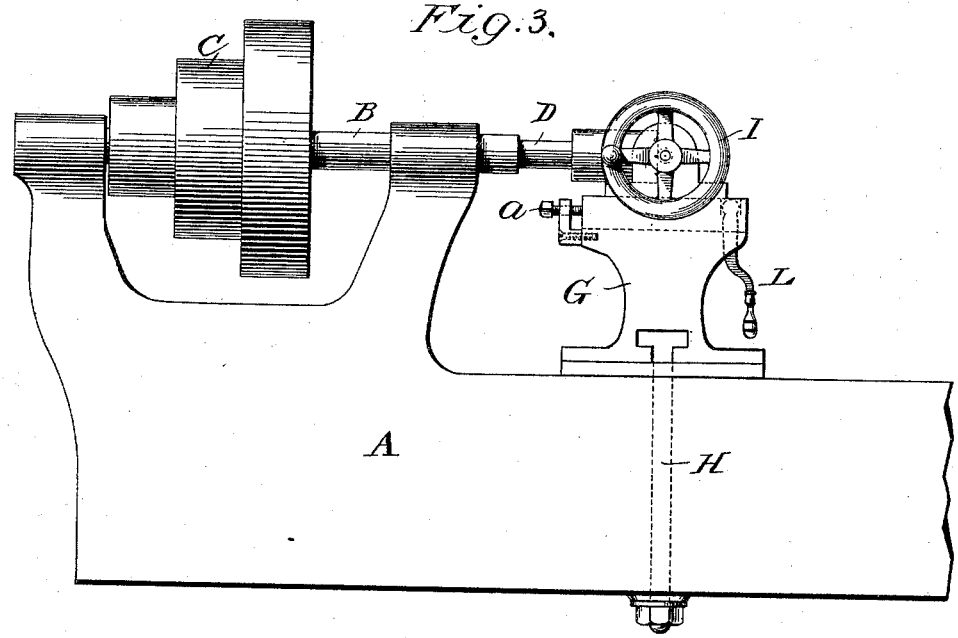
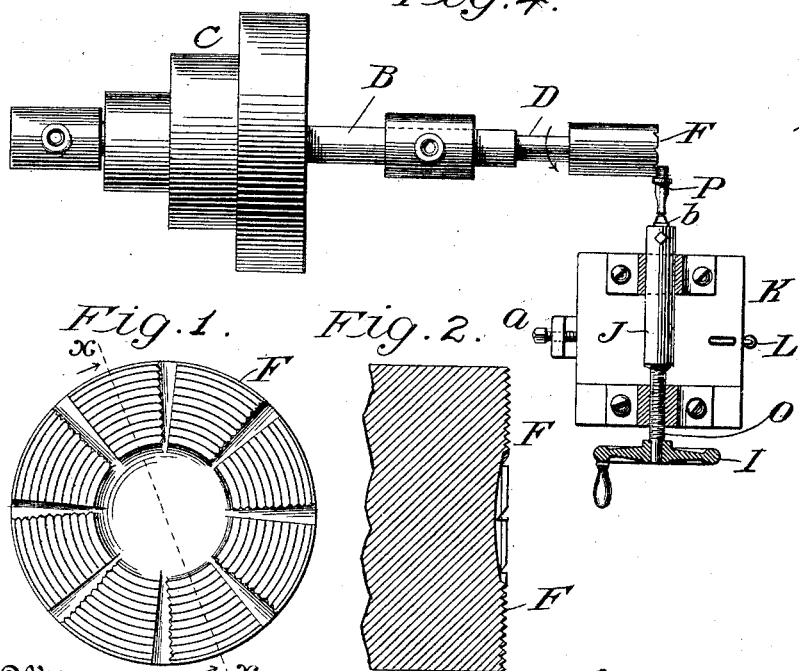
Witnesses
Edward Rowland
W. Butler
Robt. A. Hamilton, Inventor
By his Attorney
Albert Stetson

UNITED STATES PATENT OFFICE.

ROBERT A. HAMILTON, OF BROOKLYN, NEW YORK.

THREAD-CUTTING APPLIANCE.

SPECIFICATION forming part of Letters Patent No. 703,193, dated June 24, 1902.

Application filed November 9, 1900. Renewed April 3, 1902. Serial No. 101,234. (No model.)

*To all whom it may concern:*

Be it known that I, ROBERT A. HAMILTON, a citizen of the United States, and a resident of Brooklyn, in the county of King's and State of New York, have invented certain new and useful Improvements in Thread-Cutting Appliances, of which the following is a specification.

My invention has for its object to provide novel means for cutting or forming screw-threads upon various articles.

While applicable in all the arts requiring the use of threaded devices, my invention is especially useful in the formation of threads upon devices made from hard rubber, fiber, and other semihard and brittle compositions. For example, in the manufacture of fountain-pen sections having threaded shanks terminating in a usual shoulder against which the threaded end of the pen-barrel is screwed it is practically impossible with the thread-cutting appliances in use at the present time to cut the threads upon the shank of full depth and formation completely to the shoulder, and because the last threads next to the shoulder are imperfectly or insufficiently formed it is customary and necessary to remove or cut away the imperfectly-formed threads by cutting a groove in the shank and next the shoulder of a depth equivalent to the depth of the full threads and of a width sufficient to include all the imperfectly formed or cut threads. In practice this groove or "tenon," as it is frequently termed, is usually cut in the shank before the threads are formed thereupon. This groove or tenon constitutes a source of weakness in the section and renders the latter liable to break at the very point—viz., adjacent the shoulder—where it is called upon to sustain the greatest strain in screwing the adjacent sections tightly together.

My invention comprehends a device to be hereinafter described whereby screw-threads may be cut of full depth and formation close up to a shoulder, thus dispensing with the groove or tenon above referred to and correspondingly strengthening the article at that point.

In the drawings, Figure 1 is an end view of one form of cutter that may be employed in cutting threads in accordance with my invention. Fig. 2 is a transverse section of the same on the dotted line *x x*, Fig. 1. Fig. 3 in side elevation shows the running portion of an ordinary lathe in which the cutter, Fig. 1, may be employed for the cutting of threads; Fig. 4, a top view of the parts shown in Fig. 3; and Fig. 5, a view showing a pen-section having a thread cut upon its shank by the appliances illustrated in Figs. 1 to 4, inclusive.

In the embodiment of my invention selected for illustration herein and shown in the drawings, A is a usual lathe-bed; B, a driving-shaft operated by pulleys C; D, the usual shaft for holding the cutter or working appliance of the lathe.

The lathe-carriage is indicated at G, the same working in the lathe-bed in usual manner, to which it may be secured in any desired position by means of the screw-bolt H.

J is a work-carrying shaft mounted upon the carriage G, it being controlled by the power-driven or manually-operated wheel I. The lathe-carriage G has mounted upon it a sliding table K, having a movement in a direction at right angles to the plane of revolution of the cutter F, carried by the shaft D, and controlled in its movements by the lever L and the adjustable stop *a*. The sliding table K has at one end of the working shaft J a lead O, bearing a thread of the desired screw-pitch.

Referring to Fig. 1, the cutter F, preferably first, has formed upon its end a series of concentric ring-like projections of the desired cross-sectional area and separation corresponding to the cross-section of the desired thread to be cut. The end face of the cutter is then ground away radially, as shown, to leave a plurality of radial series of thread-cutting faces arranged in concentric circles about the axis of the cutter, so that in the rotation of the cutter the thread-cutting faces of one radial series will follow or track with the corresponding thread-cutting faces of all the other series.

In practicing my invention the cutter F is first mounted in the shaft B, by which it is rapidly rotated. The pen-section or other article having a shank to be threaded is then mounted on the mandrel *b* in the shaft J and the carriage adjusted to bring the side of the shank of the section into contact throughout its entire length with the end face of the rapidly-rotating cutter and with the shoulder of the shank close to and preferably in actual contact with the periphery of the cutter at the end of the latter. The effect of this is to cause the cutter to cut a series of notches or thread-sections along the side of the shank that is presented to the cutter. The wheel I is now turned once around, thus rotating the shank in front of the cutter, so that all portions of the circumference of the shank are presented to the cutter to be acted upon thereby, and were it not for the lead O this mere rotation of the section would cause the cutter to cut a series of rings about the shank of a cross-section similar to the cross-sectional shape of the cutting-surfaces; but the lead O, bearing a thread of the desired screw-pitch, causes the shank in its rotation to be advanced in the direction of its axis a distance equivalent to the pitch of the thread, and this causes the cutter to cut a series of spirals around the shank of the section instead of a series of parallel rings, the spiral pitch or turn in one rotation of the shank being exactly equal to the desired pitch of the thread. In other words, all the convolutions of the thread are formed simultaneously and to the same depth, and as one turn of the shank is sufficient to cause one convolution to merge into the next one it is obvious that a single rotation of the shank is sufficient to cut the entire screw-thread from one to the other end of the shank.

So far as the theory is concerned a single radial series of thread-cutting faces, if so constructed as to cut the full depth of the thread and held stationary with the shank rotated in front of it and given the pitch movement described, would produce the thread at a single rotation of the shank; but since it is difficult in practice by moving the rotating shank against a stationary cutter to cut a thread to the full depth by a single turn of the shank I provide a plurality of radial series of thread-cutting faces with means, as the rotating cutter F, to bring them in rapid succession into contact with the surface of the shank presented to the cutters, so as to remove the required amount of material by a series of cutting actions such as will produce a clean-cut thread at a single rotation of the shank, and obviously the successive series of thread-cutting faces may be mounted in any other manner than here shown, if found more convenient, to enable them to be brought in rapid succession in contact with and to act upon the surface of the rotating shank presented to them.

The thread-cutting means here disclosed and containing my invention possesses many important advantages that will be appreciated by those skilled in the art. One of the most important is that the thread may be extended to its full depth and form completely to the shoulder or other limit of the threaded surface without requiring any tenon or groove, as heretofore referred to. Again, the rapid rotation of the cutter produces a cleaner-cut thread than is possible with the slower methods heretofore practiced, and the entire process of threading the shank is accomplished in much shorter time than has heretofore been considered possible. Another important consideration is that skilled labor is not required in the handling of the thread-cutting appliance containing my invention, for the process is simple and requires no particular skill on the part of the operator.

My invention is not limited to the embodiment thereof here disclosed, as the same may be varied without departing from the spirit and scope of the invention.

Having described my invention and without limiting myself to details, what I claim, and desire to secure by Letters Patent, is—

1. A plurality of series of simultaneously-operable thread-cutting surfaces, means to move the same in a plane past the article to be threaded, a work-support, and means to rotate the same and to impart simultaneously thereto a pitch movement.

2. A plurality of series of simultaneously-operable thread-cutting surfaces, means to rotate the same in a plane past the article to be threaded, a work-support, and means to rotate the same and to impart simultaneously thereto a pitch movement.

3. A plurality of connected series of simultaneously-operable thread-cutting surfaces, means to move the same in a plane past the article to be threaded, a work-support, and means to rotate the same and to impart simultaneously thereto a pitch movement.

4. One or more series of thread-cutting surfaces moving while in operation in a plane tangent to the surface acted upon, a work-support, and means to impart to said series of thread-cutting surfaces and to said work-support simultaneous, relative, rotary and pitch movements.

5. A rotary head having its end face provided with one or more series of thread-cutting surfaces, a work-support, means to impart to said head bodily, and to said work-support simultaneous, relative, rotary and pitch movements.

6. A rotary head, having its end face provided with one or more radial series of thread-cutting surfaces, a work-support, and means to impart thereto simultaneous, rotary and pitch movements.

7. A plurality of traveling series of thread-cutting surfaces, corresponding surfaces of each series while cutting traveling in the same plane and path, a work-support, and means to impart thereto and to said series of thread-cutting surfaces simultaneous, relative, rotary and pitch movements.

8. A rotary head having its end face provided with one or more radial series of thread-cutting surfaces, and means to rotate the same for the purpose described.

9. The within-described screw-thread-cutting device, formed in the shape of a ring or cylinder and having on its end face a series of concentrically-arranged cutters, with means for rotating the same, to operate as described.

10. In a thread-cutting device the combination of a rotating shaft, a cutter attached thereto, having on its end face a series of concentric cutters, a work-carrying shaft, and means for moving the work at the desired pitch into contact with the concentric cutter.

Signed at New York, in the county of New York and State of New York, this 1st day of November, A. D. 1900.

ROBT. A. HAMILTON.

Witnesses:
D. C. VAN VALE,
WM. G. FRAZER.